(12) United States Patent
Sohn

(10) Patent No.: US 8,694,916 B2
(45) Date of Patent: Apr. 8, 2014

(54) METHOD AND APPARATUS FOR SPATIALLY INDICATING NOTIFICATIONS

(75) Inventor: Timothy Youngjin Sohn, Mountain View, CA (US)

(73) Assignee: Nokia Corporation, Espoo (FI)

( * ) Notice: Subject to any disclaimer, the term of this patent is extended or adjusted under 35 U.S.C. 154(b) by 258 days.

(21) Appl. No.: 13/150,829

(22) Filed: Jun. 1, 2011

(65) Prior Publication Data

US 2012/0311493 A1 Dec. 6, 2012

(51) Int. Cl.
 *G06F 3/048* (2013.01)

(52) U.S. Cl.
 USPC .......................... 715/808; 715/809; 715/835

(58) Field of Classification Search
 USPC .......................................... 715/808, 835, 809
 See application file for complete search history.

(56) References Cited

U.S. PATENT DOCUMENTS

| | | | | |
|---|---|---|---|---|
| 6,154,214 | A * | 11/2000 | Uyehara et al. | 715/863 |
| 7,124,374 | B1 * | 10/2006 | Haken | 715/859 |
| 7,490,295 | B2 * | 2/2009 | Chaudhri et al. | 715/764 |
| 2003/0071847 | A1 | 4/2003 | Vacquie | |
| 2005/0120306 | A1 * | 6/2005 | Klassen et al. | 715/765 |
| 2006/0015818 | A1 * | 1/2006 | Chaudhri et al. | 715/779 |
| 2006/0046786 | A1 | 3/2006 | Montebovi et al. | |
| 2009/0094562 | A1 * | 4/2009 | Jeong et al. | 715/863 |
| 2009/0187841 | A1 * | 7/2009 | Chaudhri et al. | 715/767 |
| 2009/0249247 | A1 * | 10/2009 | Tseng et al. | 715/808 |
| 2010/0058231 | A1 * | 3/2010 | Duarte et al. | 715/800 |
| 2010/0173677 | A1 | 7/2010 | Fu | |
| 2010/0184484 | A1 | 7/2010 | Lindberg et al. | |
| 2011/0004845 | A1 * | 1/2011 | Ciabarra | 715/808 |
| 2011/0157029 | A1 * | 6/2011 | Tseng | 345/173 |
| 2011/0161866 | A1 * | 6/2011 | Rainisto | 715/785 |
| 2012/0102437 | A1 * | 4/2012 | Worley et al. | 715/863 |
| 2012/0117507 | A1 * | 5/2012 | Tseng et al. | 715/774 |

FOREIGN PATENT DOCUMENTS

WO WO 2009/097555 A2 8/2009

OTHER PUBLICATIONS

The iPhone's Popup Problem; [online]; [Retrieved on Jun. 22, 2011]; Retrieved from the Internet <URL:http://gizmodo.com/5513100/the-iphones-popup-problem; 3 pages.
International Search Report and Written Opinion from International Application No. PCT/FI2012/050542, dated Sep. 24, 2012.

* cited by examiner

*Primary Examiner* — Daeho Song
(74) *Attorney, Agent, or Firm* — Alston & Bird LLP

(57) ABSTRACT

An apparatus, method, and computer program product are provided for spatially indicating notifications to a user via display regions that are arranged (e.g., perimeterally) about the display of an apparatus. The apparatus may include a processor and a memory including computer program code which provide for the presentation, in a first display region, of an indication of a notification associated with a first application and provide for the presentation, in a second display region, of a non-pictorial indication of a notification associated with a second application. The first and second display regions may, for example, be arranged along the edges of a polygonal display. As such, a user may be able to quickly discern which application is responsible for a particular notification, and the user's view of an underlying application provided on the display may not be obscured or diminished as a result of the issuance of the notification.

20 Claims, 8 Drawing Sheets

METHOD AND APPARATUS FOR SPATIALLY INDICATING NOTIFICATIONS

TECHNOLOGICAL FIELD

Embodiments of the present invention relate generally to displaying different types of notifications to users. In particular, embodiments of the present invention relate to an apparatus and method for spatially indicating notifications on mobile terminal displays.

BACKGROUND

Devices for providing content to users are becoming smaller and smaller to allow greater portability and mobility to the user. As a result, the displays on such devices are also becoming smaller, and display real estate is, as such becoming scarcer.

At the same time, an increasing number of applications, such as games, messaging applications, web browsers, media players, and many other types of applications are being supported by these devices. Often, users are presented with notifications from one or more of these applications. For example, a user may be notified of an incoming e-mail or text message.

Accordingly, it may be desirable to provide an improved mechanism by which a user device may be alerted as to notifications from different applications in an unobtrusive manner, while at the same time allowing the user to easily access information related to the notification as desired.

BRIEF SUMMARY OF EXAMPLE EMBODIMENTS

An apparatus is therefore provided for spatially indicating notifications to a user via display regions that are arranged about the display of the apparatus. The apparatus may include at least one processor and at least one memory including computer program code. The at least one memory and the computer program code may be configured to, with the processor, cause the apparatus to at least provide for presentation, in a first display region, of an indication of a notification associated with a first application and to provide for presentation, in a second display region, of an indication of a notification associated with a second application. The first application may be different from the second application, and the indications may be non-pictorial and may have substantially the same appearance. The first display region may be disposed in a different location from the second display region with respect to a display of the apparatus, such that a user can visually identify the application associated with the indicated notification based on the display region in which the indication is presented, only. The first and second display regions may be perimeterally arranged about the display. For example, the first display region may extend along a first edge of the display and the second display region may extend along a second edge of the display.

In some cases, the memory and computer program code may be further configured to, with the processor, cause the apparatus to provide for presentation of an indication of a lack of notifications in a respective one of the first and second display regions. Each indication of the lack of notifications may, for example, comprise a straight line. In contrast, each indication of the notification may comprise a pulse line.

The memory and computer program code may be further configured to, with the processor, cause the apparatus to provide for presentation, in a third display region, of an indication of a notification associated with a third application and to provide for presentation, in a fourth display region, of an indication of a notification associated with a fourth application. Thus, the first display region may extend along a first edge of the display; the second display region may extend along a second edge of the display; the third display region may extend along a third edge of the display; and the fourth display region may extend along a fourth edge of the display.

In some cases, the memory and computer program code may be further configured to, with the processor, cause the apparatus to receive a user input via the user's interaction with a respective one of the indications and to provide for presentation of the corresponding notification in response to the input received. The memory and computer program code may be further configured to, with the processor, cause the apparatus to receive a user input via the user's interaction with a respective one of the indications and to provide for presentation of the corresponding application upon the display in response to the input received. Furthermore, the notification indicated in the first display region may be associated with one of a first group of applications, and the notification indicated in the second display region may be associated with one of a second group of applications.

In some embodiments, a method and a computer program product are provided for spatially indicating notifications to a user via display regions. The presentation of an indication of a notification associated with a first application may be provided for, via a processor, with the indication being presented in a first display region, and the presentation of an indication of a notification associated with a second application may be provided for in a second display region. The first application may be different from the second application, and the indications may be non-pictorial and have substantially the same appearance. The first display region may be disposed in a different location from the second display region with respect to a display of the apparatus, such that a user can visually identify the application associated with the indicated notification based on the display region in which the indication is presented, only. The first display region may extend along a first edge of the display and the second display region may extend along a second edge of the display.

In some cases, the presentation of an indication of a lack of notifications may be provided for in a respective one of the first and second display regions. The method may include, in some embodiments, providing for presentation, in a third display region, of an indication of a notification associated with a third application and providing for presentation, in a fourth display region, of an indication of a notification associated with a fourth application. Furthermore, a user input may be received via the user's interaction with a respective one of the indications, and the method may provide for presentation of the corresponding notification in response to the input received. In addition or alternatively, a user input may be received via the user's interaction with a respective one of the indications, and the method may provide for presentation of the corresponding application upon the display in response to the input received.

In still other embodiments, an apparatus is provided that includes means for providing for presentation, in a first display region, of an indication of a notification associated with a first application. The apparatus may also include means for providing for presentation, in a second display region, of an indication of a notification associated with a second application. The first application may be different from the second application, and the indications may be non-pictorial and have substantially the same appearance. The first display region may be disposed in a different location from the second display region with respect to a display of the apparatus, such that a user can visually identify the application associated with the indicated notification based on the display region in which the indication is presented, only.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
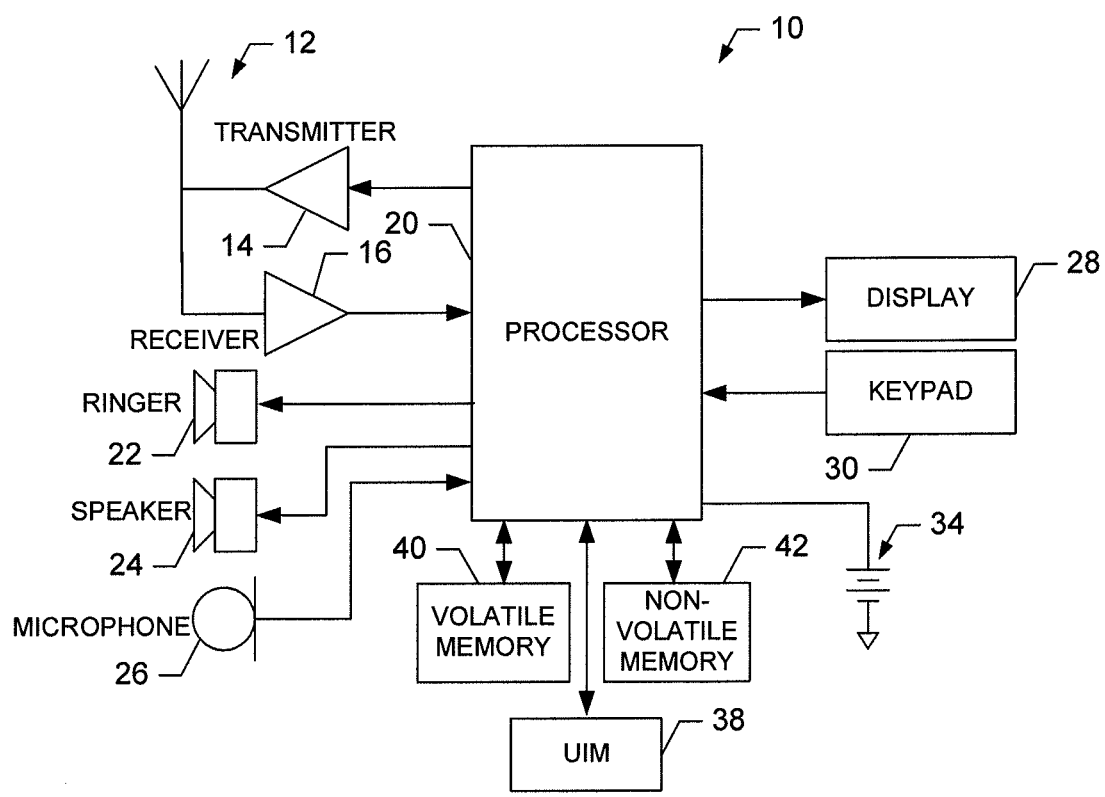
FIG. 1 illustrates one example of a communication system according to an example embodiment of the present invention.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

With advances in telecommunications, mobile terminals are becoming smaller and smaller. Although the reduced size of these devices allows for greater portability, another result is the diminished size of the display screens for these devices.

Modern mobile terminals have also been enhanced to support a large number of software applications, each of which may generate various notifications designed to alert the user of the status of the application or other events. Notifications may be generated, for example, to notify the user of an incoming call, a new text message that has been received, a new e-mail, new activity on a social networking account, completion of a file download, a change in network connectivity, etc. The increase in the number of notifications that are generated, coupled with the decrease in display size, has made screen real estate for notifications more and more precious. This is especially true when a user is running one or more applications and/or is interacting with an active display (as opposed to when there are no active applications and the display is, for example, only showing wallpaper or an inactive background or desktop).

There are currently several ways of presenting notifications to users. One method is through the use of a "toast" notification. In a toast notification, so called because the notification is presented in a manner similar to a piece of toast popping out of a toaster, a notification window slides into view from an edge of the display. Another method of presenting notifications is to designate a portion of a taskbar as a notification area that can display icons that show status information, such as at the bottom right hand side of the display. For example, a printer icon may appear in the notification area to alert the user that a print job is underway. Yet another method of presenting notifications is through the use of a modal window, which is a window that appears in a central portion of the display, overlying whatever application the user is currently interfacing with. The modal window requires user interaction (e.g., the user must click on an "OK" or "CANCEL" button) before the user can resume interfacing with the underlying application.

Each of these types of notifications, however, can have a disruptive effect on the user's interaction with an underlying application. For example, a user who is playing a video game on the mobile terminal may be constantly distracted by the appearance of toast notifications or modal windows in a portion of the display. Moreover, the user may not be able to differentiate between the different types of notifications to easily determine which application may need immediate attention based on the similar appearance of the notifications. Similarly, the notification icons that may appear on a taskbar notification area may, by necessity, be very small, such that the user may not be able to discern the type of notification that has been received until the icon is engaged and expanded.

Accordingly, embodiments of the apparatus, method, and computer program product described below provide for spatial indication of notifications to a user via display regions that are arranged (e.g., perimeterally) about the display of an apparatus, as described in greater detail below. For example, in some embodiments, multiple display regions are provided along the edges of a polygonal display, with each display region being designated to present an indication of a notification that has been generated by a particular application or a group of applications. The indications may be non-pictorial and may have substantially the same appearance; however, due to the spatial differentiation of notifications generated by different applications, a user may be able to visually identify the application associated with the indicated notification based on the display region in which the indication is presented, only. Thus, the user can quickly discern which application is responsible for a particular notification without having to interrupt concurrent interaction with an underlying application and without having the user's view of the underlying application be obscured or diminished as a result of the issuance of the notification.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for spatially indicating notifications to a user are depicted. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
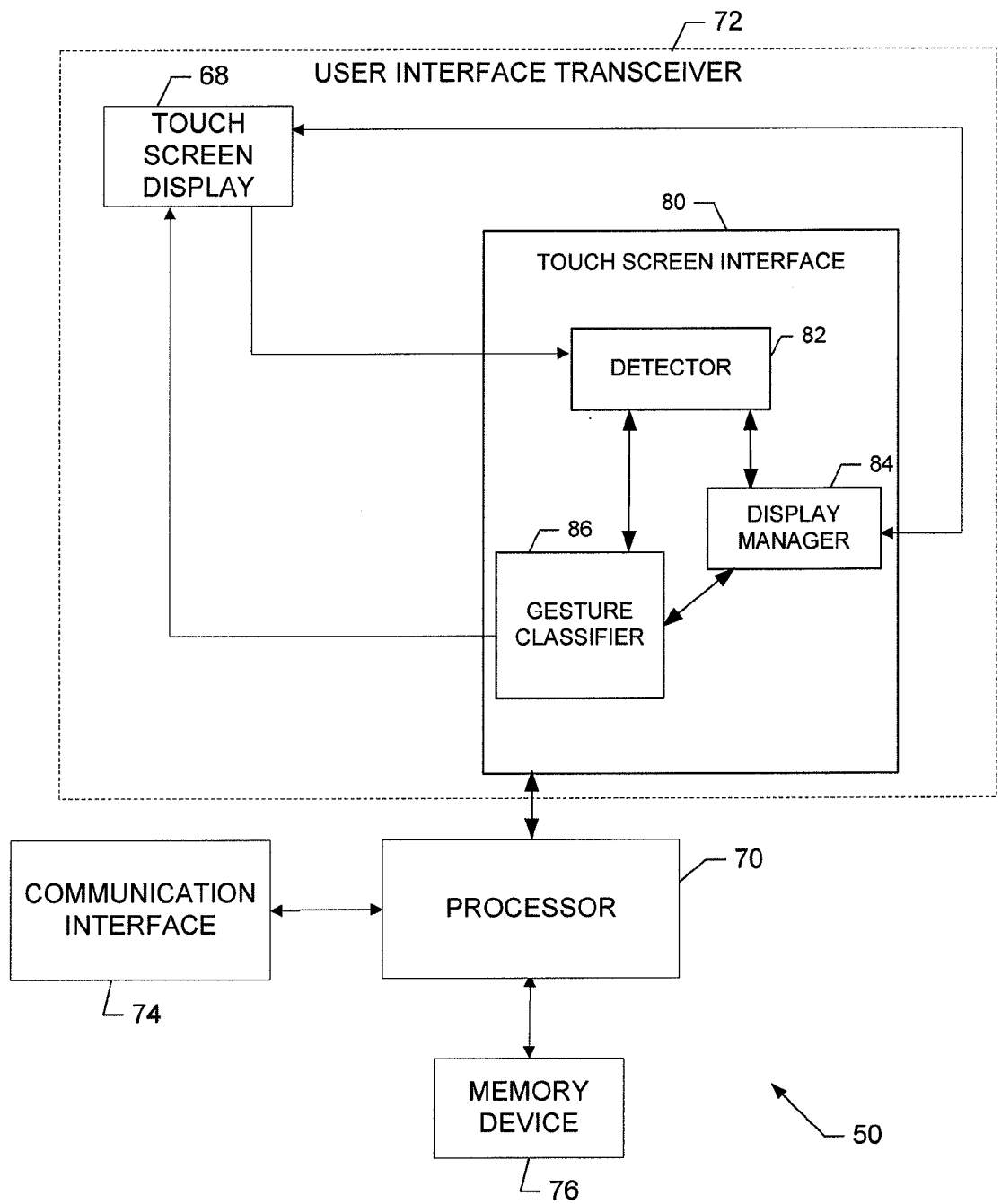
FIG. 2 illustrates a schematic block diagram of an apparatus for spatially indicating notifications according to an example embodiment of the present invention.

It should also be noted that while FIG. 2 illustrates one example of a configuration of an apparatus for spatially indicating notifications to a user, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for spatially indicating notifications to a user may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive indications of user inputs at the touch screen display 68 and to modify a response to such indications based on corresponding user actions that may be inferred or otherwise determined responsive to the indications.

In an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the indications. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive indications of user inputs in order to recognize and/or determine a touch event based on each input received at the detector 82. A touch event may be defined as a detection of an object, such as a stylus, finger, pen, pencil or any other pointing device, coming into contact with a portion of the touch screen display in a manner sufficient to register as a touch. In this regard, for example, a touch event could be a detection of pressure on the screen of the touch screen display 68 above a particular pressure threshold over a given area or the detection of a change in the electrostatic field of the touch screen display 68 at a particular location. As such, some touch events may not actually require physical contact with the touch screen display 68. For example, in some cases, the touch screen display 68 may be configured to detect one or more objects (e.g., a finger or fingers) hovering over the touch screen display 68. Gestures associated with the object or objects may also be detected in some cases, even without physical contact with the touch screen display 68. Subsequent to each touch event, the detector 82 may be further configured to pass along the data corresponding to the touch event (e.g., location of touch, length of touch, number of objects touching, touch pressure, speed of movement, direction of movement, length of delay, frequency of touch, etc.) to the gesture classifier 86 for gesture classification.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, swipe, pinch event (e.g., a pinch in or pinch out), and/or the like.

A touch may be defined as a touch event that impacts a single area (without or with minimal movement on the surface of the touch screen display 68) and then is removed. A multi-touch may be defined as multiple touch events sensed at the same time (or nearly the same time). A stroke event may be defined as a touch event followed immediately by motion of the object initiating the touch event while the object remains in contact with the touch screen display 68. In other words, the stroke event may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character. A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Figure 3:
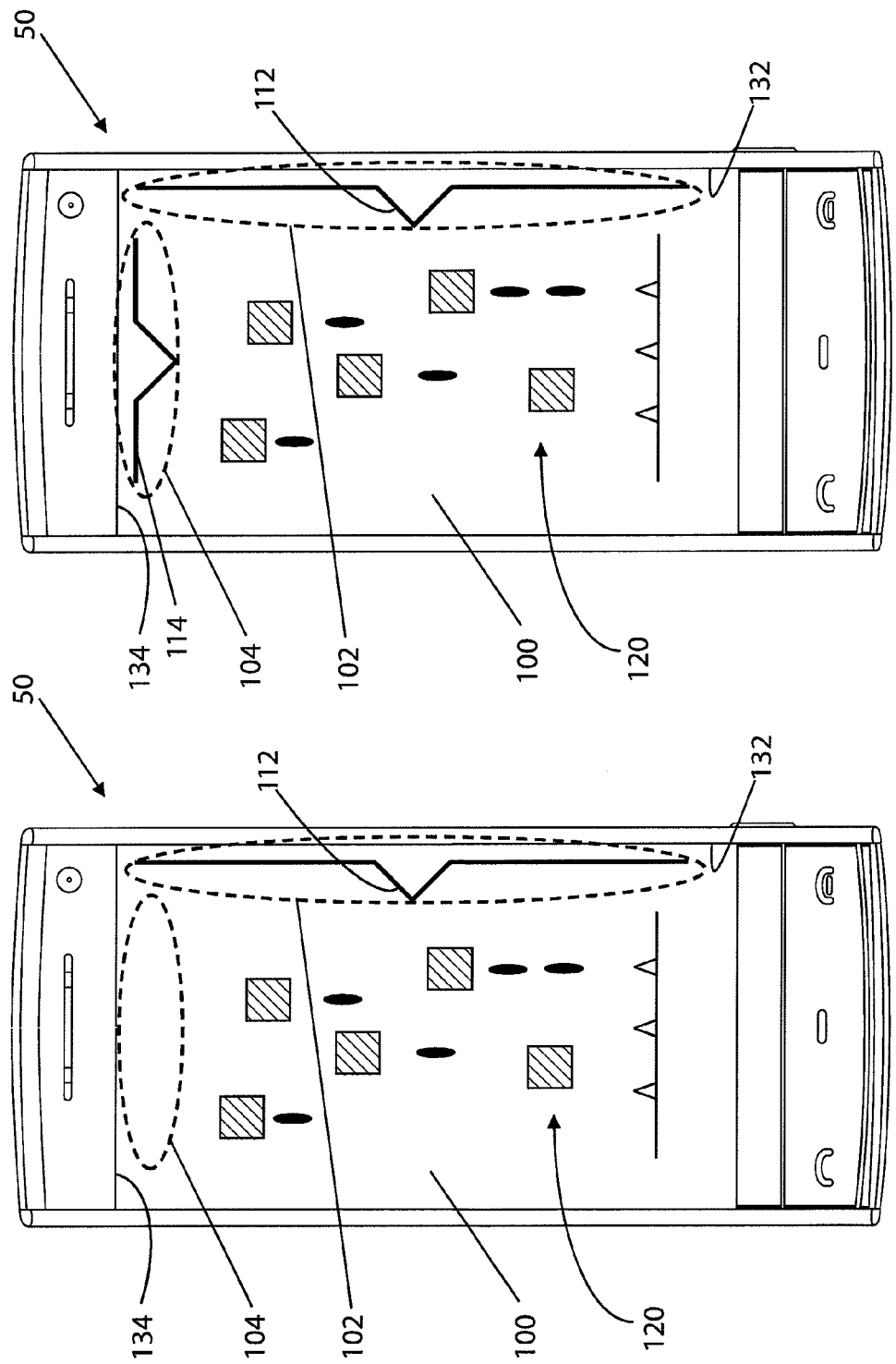
FIGS. 3A and 3B illustrate an apparatus configured to provide first and second display regions for the presentation of indications of one or more notifications in accordance with an example embodiment of the present invention.

Turning now to FIGS. 3A and 3B, in general, an apparatus 50 is provided that has a display 100 designating a first display region 102 and a second display region 104. In FIGS. 3A and 3B, the display regions 102, 104 are illustrated by dashed lines to generally indicate the location of the display regions for explanatory purposes, only. Each display region 102, 104 may be associated with a particular application. For example, the first display region 102 may be associated with an SMS (Short Messaging Service) text messaging application and may, thus, be configured to show an indication 112 of a notification generated by or otherwise relating to the SMS text messaging application. The second display region 104, on the other hand, may be associated with an e-mail application and may be configured to show an indication 104 (shown in FIG. 3B) of a notification generated by or otherwise relating to the e-mail application.

Thus, for example, a user who is using the apparatus 50 to play a video game 120, upon seeing the indication 112 presented in the first display region 102, as shown in FIG. 3A, would know that the notification indicated pertains to the SMS text messaging application. If the user is not interested in interrupting his current activity to read a text message, the user can simply continue interacting with the underlying application 120 (in this example, the video game), ignoring the indication 112 all together. Continuing this example, with reference to FIG. 3B, the user may see, in addition to the indication 112 presented in the first display region 102, an indication 114 presented in the second display region 104. The user, recognizing that an indication appearing in the second display region 104 relates to e-mail notifications (as an example), may choose to stop interacting with the underlying application 120 and instead view the e-mail notification (e.g., if the user is expecting an important e-mail).

Rather than providing indications that are descriptive of the respective notifications, such as icons or other graphics that represent the associated application or give some information regarding the particular notification, the indications 112, 114 may be non-pictorial and may have substantially the same appearance. As described in greater detail below, it is thus the position of the indications 112, 114 that provides the user with information regarding the indicated notifications, and not the indication itself. In other words, because notifications from different applications are indicated in spatially different display regions, the user is able to visually identify the application associated with the indicated notification based on the display region 102, 104 in which the indication 112, 114 is presented, only. In some cases, the first and second display regions 102, 104 may be perimeterally arranged about the display 100 (i.e., arranged along a perimeter of the display 100), such that the presence of an indication 112, as depicted in FIGS. 3A and 3B, is peripheral to the underlying application 120 and does not obscure or impair the user's interaction with the underlying application. Accordingly, upon recognizing that the indication presented does not relate to an application that interests the user at the moment, the user may continue interacting with the underlying application 120, uninterrupted.

Thus, in the embodiment shown in FIGS. 3A and 3B, the apparatus 50 comprises at least one processor 70 and at least one memory (such as memory device 76) including computer program code, as shown in FIG. 2. The at least one memory and the computer program code may be configured to, with the processor 70, cause the apparatus 50 to provide for presentation, in the first display region 102, of an indication 112 of a notification associated with a first application. The apparatus 50 may further be caused to provide for presentation, in a second display region 104, of an indication 114 of a notification associated with a second application. As described above, the first application may be different from the second application, and the indication may be non-pictorial and may have substantially the same appearance. The first display region 102 may be disposed in a different location from the second display region 104 with respect to the display 100 of the apparatus 50, such that a user can visually identify the application associated with the indicated notification based on the display region in which the indication is presented, only. In addition, the first and second display regions 102, 104 may be perimeterally arranged about the display. For example, as shown in FIGS. 3A and 3B, the first display region 102 may extend along a first edge 132 of the display, and the second display region 104 may extend along a second edge 134 of the display.

In FIG. 3A, the second display region 104 is illustrated as being empty (i.e., there are no indications presented in the second display region), which may be the case when the associated application has not issued any notifications. In some embodiments, the memory and computer program code may be configured to, with the processor, cause the apparatus 50 to provide for presentation of an indication of a lack of notifications in a respective one of the first and second display regions 102, 104. Thus, in FIG. 4, rather than showing an empty second display region 104 as a signal to the user that no notifications have been generated or caused by the associated application, the second display region 104 may include an indication 115 of the lack of notifications in the form of a straight line. In contrast, the indication 112 of a notification (shown in the first display region 102) may comprise a pulse line (e.g., a straight line with a jagged or triangular portion 113, as shown).

Although the example is provided of a straight line (indication 115) to represent the lack of notifications and a pulse line (indication 112) to represent the presence of a notification, in other embodiments, these indications may take various forms, as long as they are visually discernable and configured (i.e., sized and shaped) to be perimeterally arranged about the display 100. For example, in some embodiments, the indication 115 of a lack of notifications may be a dashed line, and the indication 112 of a notification may be a solid line (not shown). In other embodiments, the indication 115 of a lack of notifications may be a line of a certain color (e.g., gray), while the indication 112 of a notification may be a line of a different color (e.g., black) (also not shown). In still other embodiments, different patterns, colors, shapes, or types of lines may be used to differentiate between indications of a lack of notifications and indications of notifications, as long as the indications can serve to positionally indicate the respective notifications (e.g., the indications are readily discernable by the user based on the position of the respective display regions) and can be arranged (e.g., perimeterally) about the display 100 so as not to obscure the underlying application 120, as will be recognized by those skilled in the art in view of this disclosure.

Figure 5:
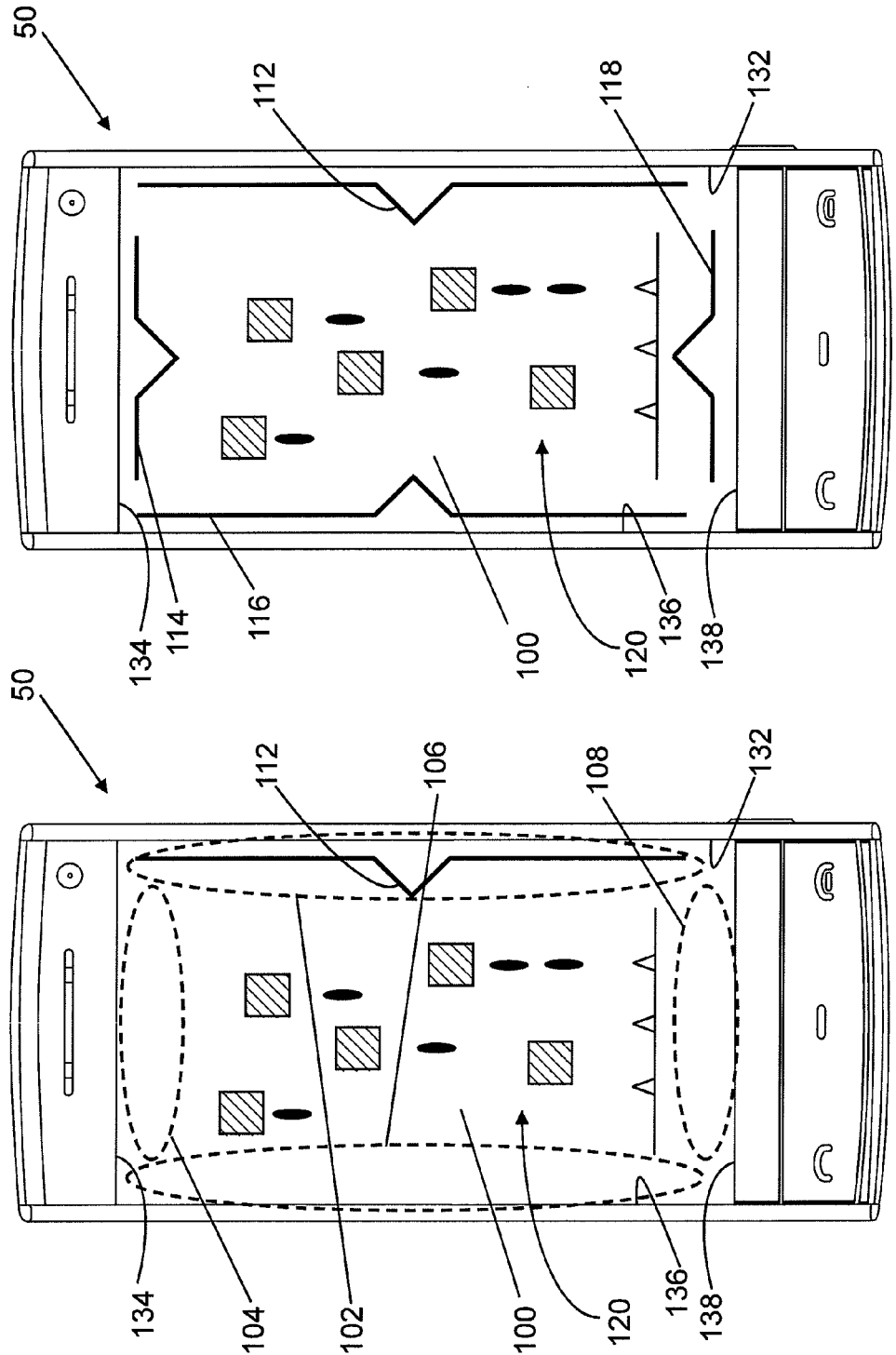
FIGS. 5A and 5B illustrate an apparatus configured to provide first, second, third, and fourth display regions for the presentation of indications of one or more notifications in accordance with an example embodiment of the present invention.

Turning to FIGS. 5A and 5B, in some cases the memory and computer program code are further configured to, with the processor, cause the apparatus 50 to provide for presentation, in a third display region 106, of an indication 116 of a notification associated with a third application. Similarly, the memory and computer program code may be configured to, with the processor, cause the apparatus 50 to provide for presentation, in a fourth display region 108, of an indication 118 of a notification associated with a fourth application. Each display region may extend along a respective edge of the display 100, as shown. Thus, the first display region 102 may extend along a first edge 132 of the display 100; the second display region 104 may extend along a second edge 134 of the display; the third display region 106 may extend along a third edge 136 of the display; and the fourth display region 108 may extend along a fourth edge 138 of the display.

Figure 6:
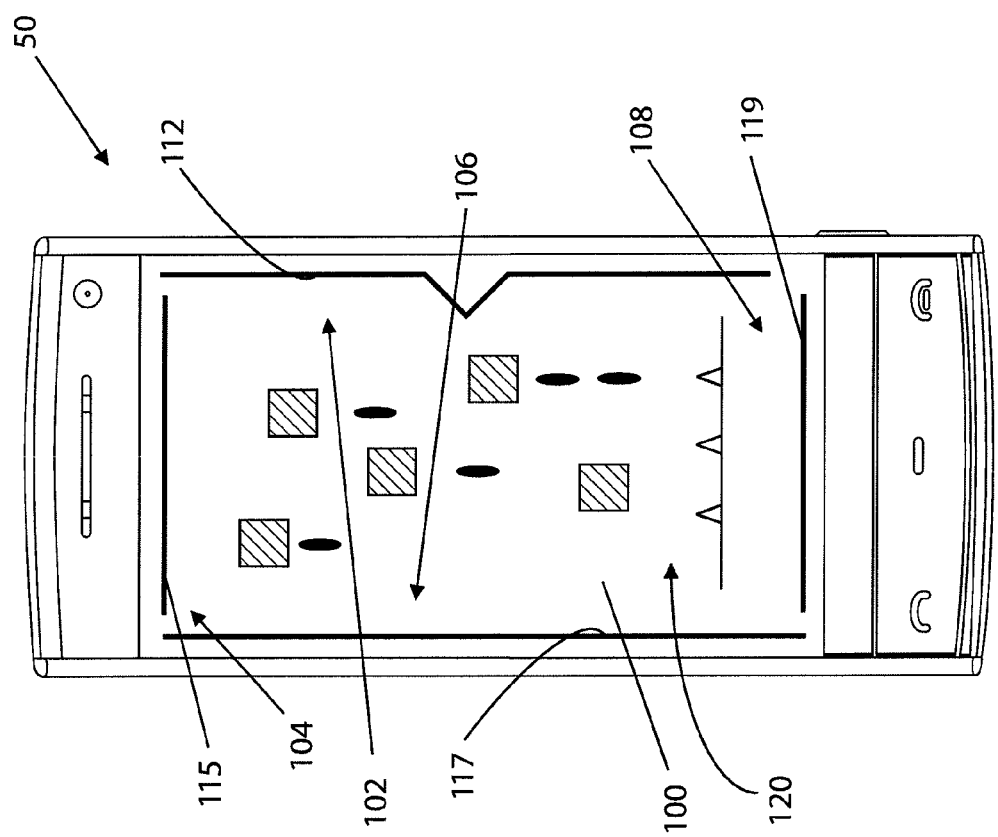
FIG. 6 shows the apparatus of FIG. 5A where an indication of a lack of notifications is presented in each of the second, third, and fourth display regions in accordance with an example embodiment of the present invention.

As described above with respect to FIG. 3A, the lack of notifications associated with a particular application may be represented by an empty display region (i.e., no indications), as is the case with the second, third, and fourth display regions 104, 106, 108 in FIG. 5A. Alternatively, with reference to FIG. 6, an indication 115, 117, 119 of a lack of notifications may be presented in each display region 104, 106, 108 for which the associated application has not generated or caused any notifications.

As with embodiments in which only two display regions are provided, each of the first, second, third, and fourth display regions 102, 104, 106, 108 may be associated with a particular application. For example, the first display region 102 may be configured to show an indication of notifications (or a lack of notifications) generated by or otherwise related to an SMS text messaging application; the second display region 104 may be configured to show an indication of notifications (or a lack of notifications) generated by or otherwise related to an e-mail application; the third display region 106 may be configured to show an indication of notifications (or a lack of notifications) generated by or otherwise related to a telephone application; and the fourth display region 108 may be configured to show an indication of notifications (or a lack of notifications) generated by or otherwise related to a social networking application. Thus, a user can tell at a glance (e.g., while interacting with an underlying application 120 provided on the display 100 of the apparatus 50) which application has issued a notification based on the particular display region presenting the indication, as described above.

In some cases, one or more of the display regions 102, 104, 106, 108 may be configured to present indications associated with more than one application. For example, the notification indicated in the first display region 102 (e.g., indication 112 in FIG. 5B) may be associated with multiple messaging applications supported by the apparatus 50, which may include messaging notifications related to different applications such as SMS text messaging applications, Internet messaging applications, and so on. Thus, regardless of what system or service was used to receive the message in this example, the notification that the user has a new message would be indicated in the first display region 102. As another example, the second display region 104 may be configured to present an indication 114 of notifications generated by or otherwise related to any one of a number of e-mail applications (such as multiple e-mail systems on which the user has accounts). Thus the user would see that an e-mail has been received via the indication 114, for example, regardless of which of the user's accounts actually received the e-mail.

Similarly, as yet another example, the third display region 106 may be configured to present an indication 116 of notifications related to phone calls in general, which may include VOIP telephone calls and calls transmitted over a cellular communications network. Continuing to build on these examples, the fourth display region 108 may present an indication 118 of notifications related to a number of social networking accounts that the user may have.

Accordingly, the notification indicated in the first display region 102 may be associated with one of a first group of applications, and the notification indicated in the second display region 104 may be associated with one of a second group of applications, such as provided in the examples above. Likewise, the notification indicated in the third display region 106 may be associated with one of a third group of applications, and the notification indicated in the fourth display region 108 may be associated with one of a fourth group of applications. Each display region 102, 104, 106, 108 may be configurable by a user to present indications of notifications associated with a particular application or group of applications, according to the user's preferences.

Furthermore, in some embodiments, the apparatus 50 may be configured such that the associated application or group of applications may change depending on the underlying application with which the user is interacting. For example, if the user is currently using the apparatus 50 to view and interact with an e-mail account, one or more of the display regions may be deactivated or modified. In other words, the user, as an example, may not be provided with the second display region 104 (which, in the example above was designated for one or more e-mail applications) while the user is accessing the e-mail application as e-mail notifications may be directly provided to the user via the e-mail application itself (i.e., any such indications 114 may be redundant and unnecessary). The user may still, however, be presented with indications 112, 116, 118 of notifications associated with other applications in the other display regions 102, 106, 108. Alternatively, the second display region 104, which was previously designated for e-mail notifications, may be at least temporarily re-designated to present notifications associated with another application, such as the underlying application with which the user temporarily stopped interacting with to access the e-mail application.

In this regard, in some embodiments, the memory and computer program code may be further configured to, with the processor, cause the apparatus 50 to receive a user input via a user's interaction with a respective one of the indications 112, 114, 116, 118 (such as shown in FIG. 5B, for example). In response to the input received, the apparatus 50 may be caused to provide for presentation of the corresponding notification.

Figure 7:
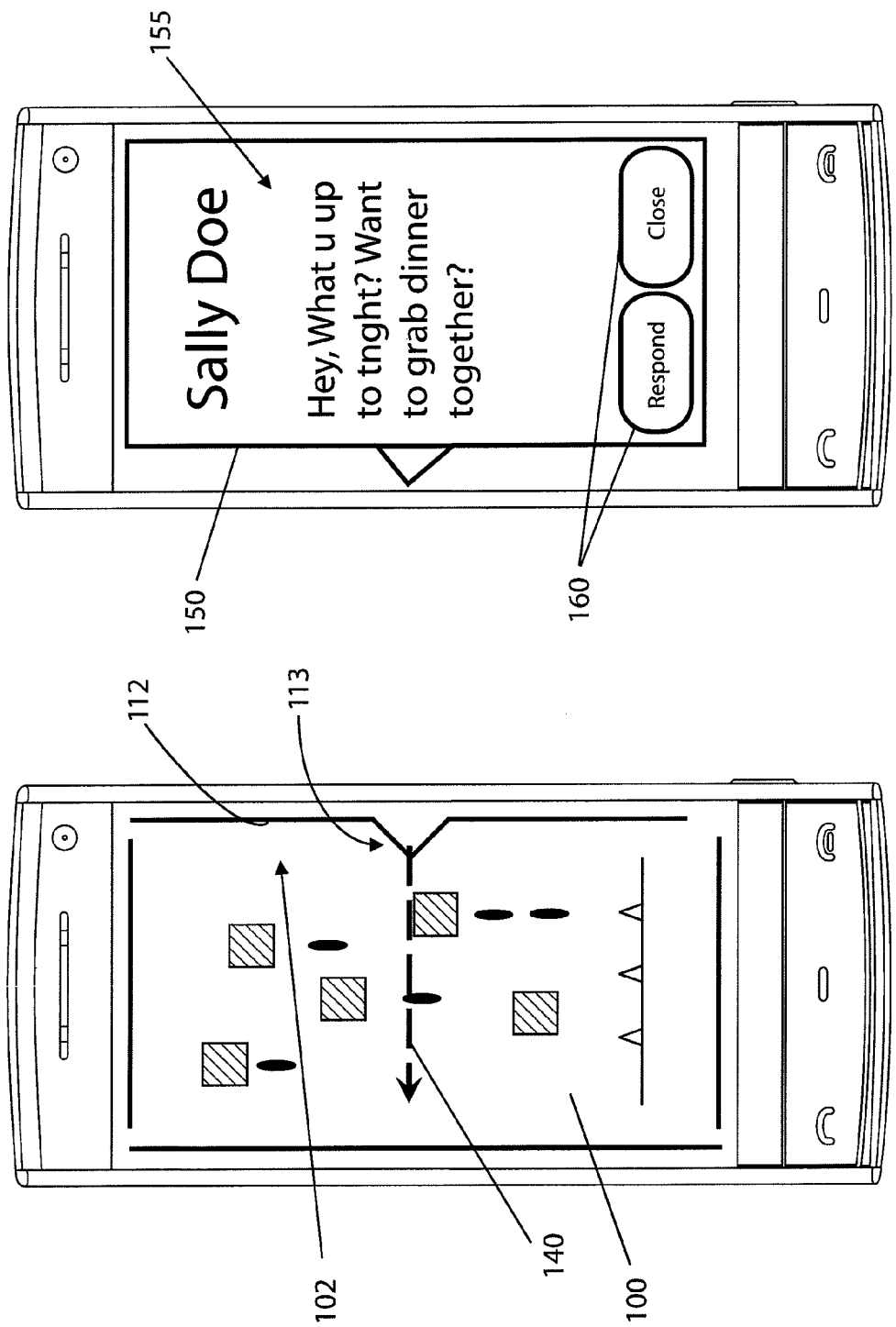
FIG. 7A illustrates a drag operation performed on the indication presented in the first display region of the apparatus of FIG. 6.
FIG. 7B illustrates the presentation of a window including the notification indicated by the indication of FIG. 7A as a result of the drag operation.

Turning to FIGS. 7A and 7B, with respect to a display 100 that is a touch screen display, for example, the user may view an indicated notification by interacting with the respective indication 112 using a drag operation 140, as indicated by the dashed line arrow in FIG. 7A. The drag operation 140 may serve to open a window 150 in which the notification is presented, as shown in FIG. 7B. The window 150 may be displayed on top of the underlying application 120, such that the underlying application is paused or temporarily disabled. For example, in response to the drag operation 140 depicted in FIG. 7A, a window 150 is opened in FIG. 7B, and a text message 155, the receipt of which was indicated by the indication 112 of FIG. 7A, is presented in the window. Thus, in this example, the notification of the receipt of a text message is the text message 155 itself. In other cases, the notification may be a statement presented to the user regarding a status change or event, as described above (e.g., "1 new text message" as opposed to the actual message received). Continuing the example of FIGS. 7A and 7B, the user may interact with the window 150, such as to respond to the text message or to close the window and return to the underlying application, by applying a touch input to the appropriate button 160 displayed within the window.

Alternatively or additionally, the memory and computer program code may be configured to, with the processor, cause the apparatus 50 to receive a user input via a user's interaction with a respective one of the indications 112, 114, 116, 118. In response to the input received, the apparatus may be caused to provide for presentation of the corresponding application upon the display. For example, the apparatus 50 may be configured such that upon receiving a touch input at the indication 112 (e.g., proximate the triangular portion 113 in the example shown in FIG. 7A), the associated application is accessed and presented upon the display. In this case, the accessed application may take the place of the underlying application on the display, and the user may be able to view the indicated notification using the functionality of the application itself. As another possibility, instead of interacting with the indication 112 to open the application, the user may simply access the application and the associated notifications through menus and/or other functionality conventionally provided by the apparatus 50, without regard to the indication 112. In other words, the indication 112 may merely serve to alert the user as to the notification, and the user may access the notification or the associated application via the conventional functionality of the apparatus.

One skilled in the art in view of this disclosure will recognize that the example embodiments described above may be modified in a number of ways to provide an apparatus for spatially indicating notifications to a user via display regions that are arranged perimeterally about the display of the apparatus. For example, although the examples and figures described above relate to a rectangular display, the display of the apparatus may be configured to have other shapes, such as other polygons with four or more sides. In this regard, more than four display regions may be provided and arranged perimeterally about the display. For example, the apparatus may have a display with five sides (i.e., five edges), and five display regions may be provided, with each display region arranged to extend along a respective edge of the display. As another example, more than one display region may be provided along each edge of the display. Thus, for example, two of the display regions may be provided along the same edge of the display, arranged in series or in parallel with respect to each other, while still allowing the user to view and interact with an underlying application without obscuring or impairing such interaction, as described above.

Figure 4:
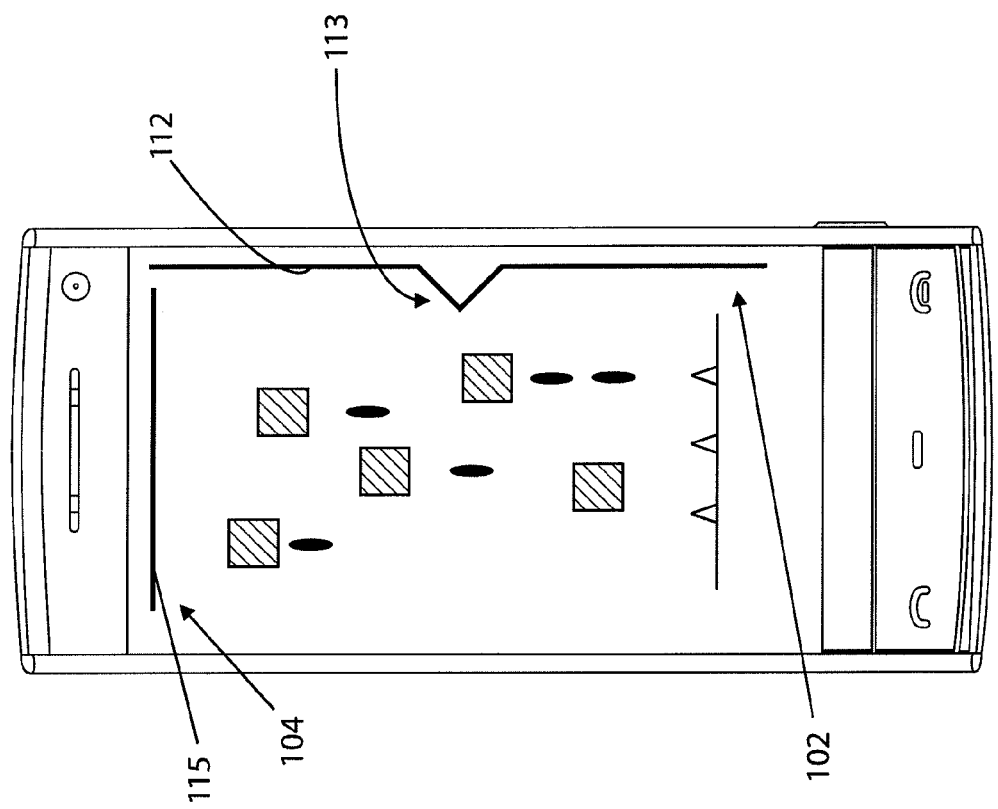
FIG. 4 shows the apparatus of FIG. 3A where an indication of a lack of notifications is presented in the second display region in accordance with an example embodiment of the present invention.

Furthermore, each indication provided in a respective display region may indicate that one or more than one notification has been issued that is associated with a particular application or group of applications. In some cases, multiple notifications may be represented by the same indication, such as the indication 112 shown in FIG. 3A. In other cases, however, the indication 112 may have a different appearance when indicating one notification as opposed to when indicating more than one notification. For example, instead of showing just one triangular portion 113 (as shown in FIG. 4), multiple triangular portions may be provided that correspond to the number of notifications being indicated. Alternatively, any number of notifications greater than one notification may be represented by a triangular portion 113, such as the one pictured in FIG. 4, alongside a smaller triangular portion (not shown). In this way, the user may get a sense of the number of notifications that have not yet been viewed by the user, without necessarily determining the exact number of notifications that await review.

In addition, in some embodiments, the memory and computer program code may be further configured to, with the processor, cause the application to provide for presentation of a descriptor in at least one of the display regions. In contrast to the non-pictorial indication, the descriptor may describe or otherwise identify the application associated with the notification that is indicated, or could be indicated, in a particular display region. For example, one or more of the display regions may include an icon or other graphic that is representative of the associated application corresponding to the indication that may be presented in that display region (e.g., an envelope for a display region in which indications of e-mail notifications may be presented). In this way, the user may have a dual basis for identifying the associated application (i.e., positionally, based on the position of the display region as described above, and pictorially, based on the presentation of the descriptor). Thus, although the examples described above and illustrated in the figures show an indication in the form of a pulse line that serves to notify a user that a notification has been issued, in still other embodiments, the indication may be presented in conjunction with the descriptor. Thus, for example, instead of the pulse line, the indication may be presented in conjunction with one or more words or a graphic that, together, directly notify the user of a particular state of the apparatus or application.

Figure 8:
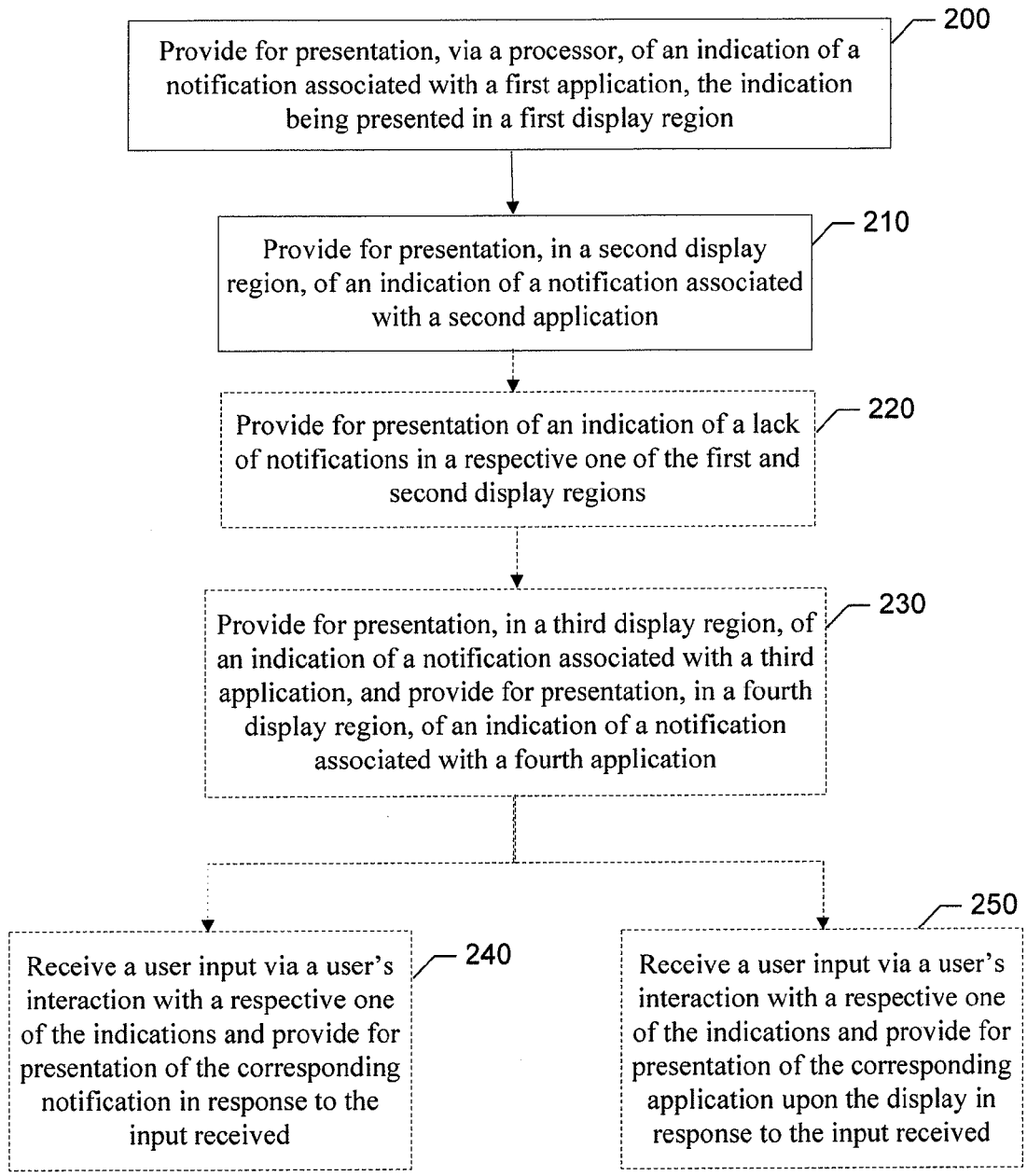
FIG. 8 illustrates a flowchart of a method of spatially indicating notifications in accordance with an example embodiment of the present invention.

FIG. 8 illustrates a flowchart of a system, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method for spatially indicating notifications to a user, as shown in FIG. 8, includes providing for presentation, via a processor, of an indication of a notification associated with a first application, the indication being presented in a first display region. Operation 200. The method further includes providing for presentation, in a second display region, of an indication of a notification associated with a second application at operation 210, as described above, wherein the first application is different from the second application. In addition, the first display region may be disposed in a different location from the second display region with respect to the display, and the first and second display regions may be perimeterally arranged about the display. For example, the first display region may extend along a first edge of the display, and the second display region may extend along a second edge of the display.

Embodiments of the method may further comprise providing for presentation of an indication of a lack of notifications in a respective one of the first and second display regions at operation 220. As described above in connection with FIGS. 4, 6, and 7A, for example, the indication of the lack of notifications may comprise a straight line. In contrast, each indication of the notification may comprise a pulse line, as shown in FIGS. 3A-7B.

In some cases, the method may further include providing for presentation, in a third display region, of an indication of a notification associated with a third application, and providing for presentation, in a fourth display region, of an indication of a notification associated with a fourth application. FIG. 8, operation 230. Thus, as noted above with respect to FIGS. 5A and 5B, the first display region may extend along a first edge of the display; the second display region may extend along a second edge of the display; the third display region may extend along a third edge of the display; and the fourth display region may extend along a fourth edge of the display.

A user input may, in some embodiments, be received via a user's interaction with a respective one of the indications. In response to the input received, presentation of the corresponding notification may be provided for at operation 240 of FIG. 8. For example, the user may perform a drag operation on the indication, which may in turn open a window in which the notification is presented, as shown in FIGS. 7A and 7B. In addition or alternatively, embodiments of the method may include providing for presentation of the corresponding application upon the display in response to the input received at operation 250 of FIG. 8.

In some embodiments, certain ones of the operations above may be modified or further amplified as described below. Furthermore, in some embodiments, additional optional operations may be included, some examples of which are shown in dashed lines in FIG. 8. Modifications, additions, or amplifications to the operations above may be performed in any order and in any combination.

In an example embodiment, an apparatus for performing the method of FIG. 8 above may comprise a processor (e.g., the processor 70 of FIG. 2) configured to perform some or each of the operations (200-250) described above. The processor may, for example, be configured to perform the operations (200-250) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 240 and 250 may comprise, for example, the processor 70 and/or a device or circuit for executing instructions or executing an algorithm for processing information as described above. Examples of means for performing operations 200-230 may comprise, for example, the processor 70, the user interface transceiver 72 (e.g., the touch screen display 68), and/or a device or circuit for executing instructions or executing an algorithm for processing information as described above. Moreover, examples of means for performing at least portions of operations 240 and 250 may comprise, for example, the processor 70, the user interface transceiver 72 (e.g., the touch screen interface 80), and/or a device or circuit for executing instructions or executing an algorithm for processing information as described above.

Although the description and associated figures describe the example of a video game as being the underlying application with which the user is interacting, one skilled in the art in light of this disclosure will recognize that the underlying application may be any of a number of applications supported by the apparatus. For example, the underlying application may be a web browser, a calendar, a contact list, a media player, and so on. In some cases, display regions may be provided for spatially indicating notifications without any underlying application being provided on the display, such as when the user is not currently using the apparatus to run any application or perform any functionality of the apparatus. In such cases, for example, the display may present a generic menu of the apparatus' functionality, or the display may show wallpaper or some other inactive background until such time that the user interacts with the apparatus to access an application. Regardless, the perimeteral arrangement of the display regions allows for the unobscured view of whatever images may be provided on the display, such that the user may select from menu items (e.g., if a menu screen is displayed), or interact with the apparatus in any way that the user would have interacted with the apparatus had the display regions not been provided.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   provide for presentation, in a first border region of a display of the apparatus, of an indication of a notification, wherein the notification is associated with a first application; and
   provide for presentation, in a second border region of the display of the apparatus, of an indication of a notification, wherein the notification is associated with a second application,
   wherein the first application is different from the second application,
   wherein association of each of the first and the second border regions with a respective application is pre-defined,
   wherein each of the first and second border regions extends along an edge of the display of the apparatus, and wherein each indication extends along a length of the respective border region;
   wherein the indications are non-pictorial and non-descriptive of the respective applications, and have substantially the same appearance, and
   wherein the first border region is disposed in a different location from the second border region with respect to the display of the apparatus, such that a user can visually identify each of the respective applications associated with the corresponding indicated notification based on the location of the border region in which the indication is presented, only.

2. The apparatus of claim 1, wherein the memory and computer program code are further configured to, with the processor, cause the apparatus to provide for presentation of an indication of an absence of notifications in a respective one of the first and second border regions.

3. The apparatus of claim 2, wherein each indication of the absence of notifications comprises a straight line.

4. The apparatus of claim 1, wherein each indication of the notification comprises a pulse line.

5. The apparatus of claim 1, wherein the memory and computer program code are further configured to, with the processor, cause the apparatus to provide for presentation, in a third border region, of an indication of a notification associated with a third application, and to provide for presentation, in a fourth border region, of an indication of a notification associated with a fourth application.

6. The apparatus of claim 5, wherein the first border region is located along a first edge of the display, wherein the second border region is located along a second edge of the display, wherein the third border region is located along a third edge of the display, and wherein the fourth border region is located along a fourth edge of the display.

7. The apparatus of claim 1, wherein the memory and computer program code are further configured to, with the processor, cause the apparatus to receive a user input via the user's interaction with a respective one of the indications and to provide for presentation of the corresponding notification in response to the input received.

8. The apparatus of claim 1, wherein the memory and computer program code are further configured to, with the processor, cause the apparatus to receive a user input via the user's interaction with a respective one of the indications and to provide for presentation of the corresponding application upon the display in response to the input received.

9. The apparatus of claim 1, wherein the notification indicated in the first border region is associated with one of a first group of applications and the notification indicated in the second border region is associated with one of a second group of applications.

10. The apparatus of claim 1, wherein each indication comprises a line having two free ends.

11. A method comprising:
    providing for presentation, via a processor, of an indication of a notification associated with a first application, the indication being presented in a first border region of a display of the apparatus; and
    providing for presentation, in a second border region of the display of the apparatus, of an indication of a notification, wherein the notification is associated with a second application,
    wherein the first application is different from the second application,
    wherein association of each of the first and the second border regions with a respective application is pre-defined,
    wherein each of the first and second border regions extends along an edge of the display of the apparatus, and wherein each indication extends along a length of the respective border region;
    wherein the indications are non-pictorial and non-descriptive of the respective applications, and have substantially the same appearance, and
    wherein the first border region is disposed in a different location from the second border region with respect to the display of the apparatus, such that a user can visually identify each of the respective applications associated with the corresponding indicated notification based on the location of the border region in which the indication is presented, only.

12. The method of claim 11 further comprising providing for presentation of an indication of an absence of notifications in a respective one of the first and second border regions.

13. The method of claim 11 further comprising providing for presentation, in a third border region, of an indication of a notification associated with a third application and providing for presentation, in a fourth border region, of an indication of a notification associated with a fourth application.

14. The method of claim 11 further comprising receiving a user input via the user's interaction with a respective one of the indications and providing for presentation of the corresponding notification in response to the input received.

15. The method of claim 11 further comprising receiving a user input via the user's interaction with a respective one of the indications and providing for presentation of the corresponding application upon the display in response to the input received.

16. The method of claim 11, wherein each indication comprises a line having two free ends.

17. A computer program product comprising at least one non-transitory computer-readable storage medium having computer-executable program code portions stored therein, the computer-executable program code portions comprising program code instructions for:

provide for presentation, in a first border region of a display of the apparatus, of an indication of a notification, wherein the notification is associated with a first application; and providing for presentation, in a second border region of the display of the apparatus, of an indication of a notification, wherein the notification is associated with a second application, wherein the first application is different from the second application, wherein association of each of the first and the second border regions with a respective application is pre-defined, wherein each of the first and second border regions extends along an edge of the display of the apparatus, and wherein each indication extends along a length of the respective border region;

wherein the indications are non-pictorial and non-descriptive of the respective applications, and have substantially the same appearance, and wherein the first border region is disposed in a different location from the second border region with respect to display of the apparatus, such that a user can visually identify each of the respective applications associated with the corresponding indicated notification based on the location of the border region in which the indication is presented, only.

18. The computer program product of claim 17 further comprising program code instructions for providing for presentation of an indication of an absence of notifications in a respective one of the first and second border regions.

19. The computer program product of claim 17 further comprising program code instructions for receiving a user input via the user's interaction with a respective one of the indications and providing for presentation of the corresponding notification in response to the input received.

20. The computer program product of claim 17, wherein each indication comprises a line having two free ends.

* * * * *